US010144673B2

(12) United States Patent
Bichler et al.

(10) Patent No.: US 10,144,673 B2
(45) Date of Patent: Dec. 4, 2018

(54) METHOD FOR PRODUCING A CALCIUM SILICATE HYDRATE-COMPRISING HARDENING ACCELERATOR IN POWDER FORM

(71) Applicant: BASF SE, Ludwigshafen (DE)

(72) Inventors: Manfred Bichler, Engelsberg (DE); Martin Winklbauer, Halsbach (DE); Torben Gaedt, Traunstein (DE); Joachim Dengler, Tacherting (DE); Christoph Hesse, Ebersberg (DE); Bernhard Mayr, Burgkirchen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/560,552

(22) PCT Filed: Apr. 20, 2016

(86) PCT No.: PCT/EP2016/058754
§ 371 (c)(1),
(2) Date: Sep. 22, 2017

(87) PCT Pub. No.: WO2016/169981
PCT Pub. Date: Oct. 27, 2016

(65) Prior Publication Data
US 2018/0050962 A1  Feb. 22, 2018

(30) Foreign Application Priority Data

Apr. 21, 2015 (EP) ..................................... 15164499

(51) Int. Cl.
| | | |
|---|---|---|
| *C04B 28/02* | (2006.01) | |
| *C04B 40/00* | (2006.01) | |
| *C04B 14/04* | (2006.01) | |
| *C04B 22/00* | (2006.01) | |
| *C04B 22/06* | (2006.01) | |
| *C04B 24/24* | (2006.01) | |
| *C04B 24/26* | (2006.01) | |
| *C04B 103/14* | (2006.01) | |

(52) U.S. Cl.
CPC ............ *C04B 28/02* (2013.01); *C04B 14/043* (2013.01); *C04B 22/0086* (2013.01); *C04B 22/064* (2013.01); *C04B 24/246* (2013.01); *C04B 24/2605* (2013.01); *C04B 24/267* (2013.01); *C04B 40/0042* (2013.01); *C04B 2103/14* (2013.01)

(58) Field of Classification Search
CPC ..... C04B 28/02; C04B 24/267; C04B 24/246; C04B 24/2605; C04B 40/0042; C04B 14/043; C04B 22/0086; C04B 22/064; C04B 2103/14; C04B 2103/001
See application file for complete search history.

(56) References Cited

U.S. PATENT DOCUMENTS

| | | | | |
|---|---|---|---|---|
| 3,144,346 A | * | 8/1964 | Dilnot | .................... C04B 38/106 106/672 |
| 3,427,175 A | * | 2/1969 | Angstadt | ................ C04B 22/085 106/713 |
| 3,501,324 A | * | 3/1970 | Kazuhiko | ............... C01B 33/22 106/796 |
| 5,580,508 A | * | 12/1996 | Kobayashi | .............. C04B 7/323 264/234 |
| 5,709,743 A | | 1/1998 | Leture et al. | |
| 6,211,317 B1 | | 4/2001 | Albrecht et al. | |
| 7,041,167 B2 | | 5/2006 | Jiang | |
| 8,202,362 B2 | | 6/2012 | Davidovits et al. | |
| 8,561,701 B2 | | 10/2013 | Patil et al. | |
| 8,608,847 B2 | | 12/2013 | Buerge et al. | |
| 9,028,610 B2 | | 5/2015 | Pardal et al. | |
| 9,040,609 B2 | | 5/2015 | Langlotz et al. | |
| 9,045,377 B2 | | 6/2015 | Nicoleau et al. | |
| 9,145,335 B2 | | 9/2015 | Wombacher et al. | |
| 9,388,077 B2 | | 7/2016 | Nicoleau et al. | |
| 9,567,262 B2 | | 2/2017 | Nicoleau et al. | |
| 9,598,315 B2 | | 3/2017 | Hesse et al. | |
| 9,802,864 B2 | * | 10/2017 | Hesse | .................. C04B 40/0042 |
| 9,926,233 B2 | * | 3/2018 | Assmann | ................ C04B 28/04 |
| 2011/0269875 A1 | | 11/2011 | Nicoleau et al. | |
| 2012/0216724 A1 | | 8/2012 | Nicoleau et al. | |
| 2013/0035423 A1 | | 2/2013 | Sabio et al. | |
| 2014/0331899 A1 | | 11/2014 | Wombacher et al. | |
| 2015/0075409 A1 | | 3/2015 | Darguy et al. | |
| 2015/0148456 A1 | | 5/2015 | Eissmann et al. | |
| 2015/0152008 A1 | | 6/2015 | Langlotz et al. | |
| 2015/0203403 A1 | | 7/2015 | Enders | |

(Continued)

FOREIGN PATENT DOCUMENTS

| | | |
|---|---|---|
| CN | 1120525 A | 4/1996 |
| EP | 0 894 811 A1 | 2/1999 |

(Continued)

OTHER PUBLICATIONS

PCT/EP2016/058754—International Search Report, dated Jun. 24, 2016.

(Continued)

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

The invention relates to a method for producing a calcium silicate hydrate-comprising hardening accelerator in powder form, which comprises the steps of
(a) providing an aqueous suspension comprising calcium silicate hydrate;
(b) mixing at least one calcium compound, selected from calcium acetate, calcium formate, calcium hydroxide, calcium oxide, and mixtures of two or more of said compounds, with the aqueous suspension comprising calcium silicate hydrate; and
(c) drying the resulting mixture.
The invention also relates to the hardening accelerator obtainable by this method, to the use thereof, and to building material mixtures which comprise the hardening accelerator.

13 Claims, No Drawings

(56) References Cited

U.S. PATENT DOCUMENTS

| | | |
|---|---|---|
| 2015/0344368 A1 | 12/2015 | Hesse et al. |
| 2017/0107148 A1 | 4/2017 | Nicoleau et al. |

FOREIGN PATENT DOCUMENTS

| | | |
|---|---|---|
| JP | 2004149669 A * | 5/2004 |
| JP | 2005131608 A * | 5/2005 |
| WO | WO 93/22252 A1 | 11/1993 |
| WO | WO 95/04007 A1 | 2/1995 |
| WO | WO 02/070425 A1 | 9/2002 |
| WO | WO 2008/012438 A2 | 1/2008 |
| WO | WO 2010/026155 A1 | 3/2010 |
| WO | WO 2011/026720 A1 | 3/2011 |
| WO | WO 2011/026723 A1 | 3/2011 |
| WO | WO 2011/029711 A1 | 3/2011 |
| WO | WO 2011/104347 A1 | 9/2011 |
| WO | WO 2011/131904 A1 | 10/2011 |
| WO | WO 2012/025567 A1 | 3/2012 |
| WO | WO 2012/072466 A1 | 6/2012 |
| WO | WO 2012/085508 A1 | 6/2012 |
| WO | WO 2012/143205 A1 | 10/2012 |
| WO | WO 2012/143206 A1 | 10/2012 |
| WO | WO 2012/160319 A1 | 11/2012 |
| WO | WO 2013/017391 A1 | 2/2013 |
| WO | WO 2013/083627 A1 | 6/2013 |
| WO | WO 2013/093034 A1 | 6/2013 |
| WO | WO 2013/150145 A1 | 10/2013 |
| WO | WO 2013/178417 A1 | 12/2013 |
| WO | WO 2013/178560 A1 | 12/2013 |
| WO | WO 2014/016209 A1 | 1/2014 |
| WO | WO 2014/026938 A1 | 2/2014 |
| WO | WO 2014/114782 A1 | 7/2014 |
| WO | WO 2014/114784 A1 | 7/2014 |

OTHER PUBLICATIONS

PCT/EP2016/058754—International Written Opinion, dated Jun. 24, 2016.

PCT/EP2016/058754—International Preliminary Report on Patentability, dated Oct. 24, 2017.

Extended European Search Report for EP Patent Application No. 15164499.4, dated Oct. 2, 20151.

* cited by examiner

METHOD FOR PRODUCING A CALCIUM SILICATE HYDRATE-COMPRISING HARDENING ACCELERATOR IN POWDER FORM

CROSS REFERENCE TO RELATED APPLICATIONS

This application is a national stage application of International Application No. PCT/EP2016/058754, filed 20 Apr. 2016, which claims priority from European Patent Application No. 15164499.4, filed 21 Apr. 2015, which applications are incorporated herein by reference.

The invention relates to a method for producing a calcium silicate hydrate (C-S-H)-comprising hardening accelerator in powder form and also to the calcium silicate hydrate (C-S-H)-comprising hardening accelerator in powder form obtainable by this method, to the use thereof, and to building material mixtures which comprise the hardening accelerator.

It is known that additives are often added to aqueous slurries of organic or inorganic substances in powder form, such as clays, finely ground silicate, chalk, carbon black, finely ground rocks, and hydraulic binders, for the purpose of improving their processing properties—i.e., kneadability, spreadability, sprayability, pumpability, or fluidity. Certain additives, comprising hardening accelerators, have the capacity to shorten the hardening procedure. This property is also exploited deliberately in connection, in particular, with the production of building material mixtures which comprise hydraulic binders, such as cement, lime, gypsum, calcium sulfate hemihydrate (bassanite), or anhydrous calcium sulfate (anhydrite), or latent hydraulic binders such as flyash, blast furnace slag, or pozzolans.

WO 2010/026155 discloses a composition in the form of a suspension which comprises a water-soluble comb polymer suitable as plasticizer for hydraulic binders, and also C-S-H particles with a particle diameter <500 nm. Calcium sources used in the prior art for producing the C-S-H particles include calcium formate, calcium chloride, calcium nitrate, calcium acetate, and calcium sulfate. As compared with a powder product, however, the suspension in practice is more awkward to handle. The calcium silicate hydrate (C-S-H)-comprising hardening accelerator in powder form can be produced from the suspension by various drying technologies, such as spray drying or roll drying, as also described in WO 2010/026155.

WO 2012/025567 describes a method for producing a setting and hardening accelerator for hydraulic binders by reacting a calcium compound, which among others may be calcium sulfamate, with a silicon compound, accompanied by addition of a phosphonic acid derivative that comprises a polyalkylene oxide chain. The phosphonic acid derivative is prepared by esterifying or amidating a phosphonic acid compound with one or more polyalkylene oxide compounds.

WO 2013/083627 describes a method for producing a setting and hardening accelerator for mineral binders, comprising the steps of reacting a calcium compound with a silicon compound and of adding an acidic compound having a molecular weight of not more than 200 g/mol. It involves the addition of an excess of the acidic compound and the addition of a further hardening accelerator, namely methyldiethanolamine, to a solution of the calcium compound. The mixture is then mixed with a solution of the silicon compound without the use of a dispersant. The setting and hardening accelerator may also be present in powder form and is preferably free-flowing and/or substantially free of water.

WO 2014/114784 discloses an additive for hydraulically setting compositions that as well as C-S-H also includes a polymeric dispersant and also a sulfonic acid compound. This sulfonic acid compound is selected from compounds including calcium sulfamate and/or calcium methanesulfonate. The additive may be present in the form of a suspension or as a powder, and is obtainable by reaction of a water-soluble calcium compound with a water-soluble silicate compound in the presence of an aqueous solution of a dispersant, with addition of a water-soluble, nonpolymeric salt of a sulfonic acid. For the preparation of the powder, the salt of a sulfonic acid may be added before, during, or after the reaction. The salt of a sulfonic acid is added prior to drying in order to improve the performance of the resultant powder. This, however, only yields powders which do not attain the performance level of the original suspension. With the additive in powder form, a maximum of 90% of the original acceleration performance is possible (derived from the cumulative heats after 6 hours, in heat flow calorimetry). The powder must therefore be metered at significantly higher levels in order to apply the same acceleration performance.

The C-S-H powder produced from a C-S-H suspension in accordance with the prior art has a significantly reduced acceleration performance as compared with the suspension, and must therefore be metered at higher levels. It has emerged, moreover, that the C-S-H powders produced in accordance with the prior art are difficult to disperse in the cement paste again.

It is an object of the invention, therefore, to avoid the disadvantages of the prior art hardening accelerators.

It is a further object to provide a hardening accelerator in powder form on the basis of C-S-H which shows an improved acceleration performance as compared to a prior art hardening accelerator on C-S-H basis in powder form, i.e. after drying the suspension of the prior art hardening accelerator.

It is a further object to provide a hardening accelerator in powder form on the basis of C-S-H which shows an improved redispersibility in the cement paste.

Surprisingly it has now found that these objects are achieved when a certain calcium compound is added to the C-S-H suspension prior to drying.

The present invention therefore relates to a method for producing a calcium silicate hydrate (C-S-H)-comprising hardening accelerator in powder form, which comprises the steps of (a) providing an aqueous suspension comprising calcium silicate hydrate;

(b) mixing a calcium compound, selected from calcium acetate, calcium formate, calcium hydroxide, calcium oxide, or a mixture of two or more of said compounds, with the suspension comprising calcium silicate hydrate; and (c) drying the resulting mixture.

Step (a):

Depending on the method of production, a C-S-H-comprising suspension may comprise constituents associated with the production process, such as dispersants or anions and cations from the reaction of a calcium source with a silicate source (hardening accelerator suspension).

Calcium silicate hydrate (C-S-H) may also comprise foreign ions, such as magnesium and aluminum, and in the majority of cases conforms to the following empirical formula:

$$a\ CaO,\ SiO_2,\ b\ Al_2O_3,\ c\ H_2O,\ d\ Z_2O,\ e\ WO$$

Z is an alkali metal

W is an alkaline earth metal; preferably W is an alkaline earth metal which is different from calcium

| | | |
|---|---|---|
| 0.1 ≤ a ≤ 2 | preferably | 0.66 ≤ a ≤ 1.8 |
| 0 ≤ b ≤ 1 | preferably | 0 ≤ b ≤ 0.1 |
| 1 ≤ c ≤ 6 | preferably | 1 ≤ c ≤ 4.0 |
| 0 ≤ d ≤ 1 | preferably | 0 ≤ d ≤ 0.4 |
| 0 ≤ e ≤ 2 | preferably | 0 ≤ e ≤ 0.1 |

With particular preference the molar ratios are selected such that in the empirical formula above, the preferred ranges for a, b, and e are fulfilled (0.66≤a≤1.8; 0≤b≤0.1; 0≤e≤0.1).

With particular preference the calcium and silicate ions, expressed by the oxides CaO and $SiO_2$, are fully bound in the C-S-H, so that the molar ratio of $CaO/SiO_2$ in the entire C-S-H-comprising suspension is in the range 0.66 to 1.8, preferably 0.8 to 1.6, and more preferably is 1.0 to 1.5.

The molar calcium content is generally in the range from 0.01 to 5 mol Ca per kg suspension, preferably 0.1 to 3.5 mol Ca per kg suspension, and more preferably 0.2 to 2.5 mol Ca per kg suspension.

In the compositions of the invention, the calcium silicate hydrate is present preferably in the form of foshagite, hillebrandite, xonotlite, nekoite, clinotobermorite, 9 Å—tobermorite (riversiderite), 11 Å—tobermorite, 14 Å—tobermorite (plombierite), jennite, metajennite, calcium chondrodite, afwillite, $\alpha$-$C_2SH$, dellaite, jaffeite, rosenhahnite, killalaite and/or suolunite, more preferably as xonotlite, 9 Å—tobermorite (riversiderite), 11 Å—tobermorite, 14 Å—tobermorite (plombierite), jennite, metajennite, afwillite and/or jaffeite. The molar ratio of calcium to silicon in the calcium silicate hydrate is preferably from 0.6 to 2 and more preferably from 1.0 to 1.8. The molar ratio of calcium to water in the calcium silicate hydrate is preferably 0.6 to 6, more preferably 0.6 to 2, and especially preferably 0.8 to 2. The C-S-H is present preferably in X-ray-amorphous form, with crystallite sizes of smaller than 30 nm, more preferably smaller than 15 nm, as determinable by way of the Debye-Scherrer equation for evaluating the peak width of the 010 reflection of the C-S-H in an X-ray diffractogram.

Any calcium silicate hydrate suitable as a hardening accelerator can be used in accordance with the invention. Examples thereof are low-density C-S-H as per WO 02/070425 A1, C-S-H gel as per WO 93/22252, C-S-H as per WO 95/04007 C-S-H seeds as per WO 2011/131904 A1, C-S-H obtainable as per WO 2012/025567 A1, C-S-H seeds as per WO 2012/085508 A1, C-S-H as per WO 2012/160319 A1, C-S-H powder as per WO 2013/017391 A1, C-S-H obtainable as per WO 2013/083627 A1, C-S-H obtainable as per WO 2013/093034 A1, C-S-H as per WO 2013/150145 A1, C-S-H seeds as per WO 2014/016209 A1, C-S-H as per WO 2014/053699 A1, and C-S-H obtainable as per WO2010/026155, WO2011/029711, WO2011/026720, WO2011/026723, WO2011/104347, WO2012/072466, WO2012/143206, WO2012/143205, WO2014/026938, WO2013/178417, WO2013/178560, WO2014/114782 or WO2014/114784, and also mixtures of these C-S-Hs. In accordance with this prior art, the C-S-H is either obtained already as a suspension, or can be suspended in water in a conventional manner.

The solids content of the hardening accelerator suspensions from step (a) is generally 0.5 to 60 wt %, preferably 2-50 wt %, more preferably 5-40 wt %, and especially preferably 10-35 wt %. This solids content is determined by drying of the suspension at 105° C. to constant weight and determination of the residual mass in relation to the original mass of the suspension.

Nevertheless preferred is the use of C-S-H suspensions produced as described in WO 2010/026155 and in WO 2014/114784. These publications are incorporated in their entirety by reference.

The C-S-H suspension as per WO 2010/026155 is prepared by reaction of a water-soluble calcium compound with a water-soluble inorganic silicon compound in the presence of at least one polymeric dispersant that comprises structural units having anionic or anionogenic groups and structural units having polyether side chains (comb polymer).

The water-soluble calcium compound for preparing the C-S-H suspension is preferably selected from calcium chloride, calcium nitrate, calcium formate, calcium acetate, calcium bicarbonate, calcium bromide, calcium carbonate, calcium citrate, calcium chlorate, calcium chloride, calcium fluoride, calcium gluconate, calcium hydroxide, calcium oxide, calcium hypochlorite, calcium iodate, calcium iodide, calcium lactate, calcium nitrate, calcium nitrite, calcium oxalate, calcium phosphate, calcium propionate, calcium silicate, calcium stearate, calcium sulfate, calcium sulfate hemihydrate, calcium sulfate dihydrate, calcium sulfide, calcium tartrate, calcium aluminate, and mixtures of two or more of these components. Preference is given to calcium citrate, calcium acetate, calcium formate, calcium sulfate, and mixtures of two or more of these components, and especially calcium chloride or calcium nitrate or mixtures thereof.

The water-soluble silicon compound is preferably selected from sodium silicate, potassium silicate, waterglass, aluminum silicate, calcium silicate, silica, sodium metasilicate, potassium metasilicate, and mixtures of two or more of these components. A preferred silicate compound is one selected from an alkali metal silicate of the formula m $SiO_2$·n $M_2O$, where M is Li, Na, K, and $NH_4$, preferably Na or K, or mixtures thereof, m and n are molar numbers, and the ratio m:n is about 0.9 to about 4, preferably about 0.9 to about 3.8, and more particularly about 0.9 to about 3.6.

The polymeric dispersant comprises as its anionic or anionogenic group at least one structural unit of the general formulae (Ia), (Ib), (Ic) and/or (Id):

in which $R^1$ is H or an unbranched or branched $C_1$-$C_4$ alkyl group, $CH_2COOH$ or $CH_2CO$—X—$R^3$;

X is NH—$(C_nH_{2n})$ or O—$(C_nH_{2n})$ with n=1, 2, 3 or 4, or is a chemical bond, the nitrogen atom or the oxygen atom being bonded to the CO group;

$R^2$ is OM, $PO_3M_2$, or O—$PO_3M_2$; with the proviso that X is a chemical bond if $R^2$ is OM;

$R^3$ is $PO_3M_2$, or O—$PO_3M_2$;

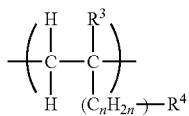
(Ib)

in which
$R^3$ is H or an unbranched or branched $C_1$-$C_4$ alkyl group;
n is 0, 1, 2, 3 or 4;
$R^4$ is $PO_3M_2$, or $O\text{---}PO_3M_2$;

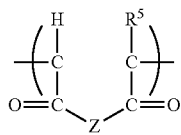
(Ic)

in which
$R^5$ is H or an unbranched or branched $C_1$-$C_4$ alkyl group;
Z is O or $NR^7$; and
$R^7$ is H, $(C_nH_{2n})\text{---}OH$, $(C_nH_{2n})\text{---}PO_3M_2$, $(C_nH_{2n})\text{---}OPO_3M_2$, $(C_6H_4)\text{---}PO_3M_2$ or $(C_6H_4)\text{---}OPO_3M_2$,
n is 1, 2, 3 or 4;

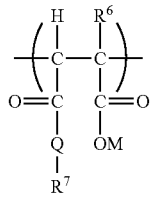
(Id)

in which
$R^6$ is H or an unbranched or branched $C_1$-$C_4$ alkyl group;
Q is $NR^7$ or O;
$R^7$ is H, $(C_nH_{2n})\text{---}OH$, $(C_nH_{2n})\text{---}PO_3M_2$, $(C_nH_{2n})\text{---}OPO_3M_2$, $(C_6H_4)\text{---}PO_3M_2$ or $(C_6H_4)\text{---}OPO_3M_2$,
n is 1, 2, 3 or 4; and
each M in the above formulae, independently of one another, is H or one cation equivalent.

According to one embodiment, the polymeric dispersant comprises as its anionic or anionogenic group at least one structural unit of the formula (Ia) in which $R^1$ is H or $CH_3$; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O. According to a further embodiment, the polymeric dispersant comprises as its anionic or anionogenic group at least one structural unit of the formula (Ia) in which $R^1$ is H or $CH_3$ and $XR^2$ is OM or X is $O(C_nH_{2n})$ with n=1, 2, 3 or 4, more particularly 2, and $R^2$ is $O\text{---}PO_3M_2$.

As its polyether side chain, the polymeric dispersant comprises at least one structural unit of the general formulae (IIa), (IIb), (IIc) and/or (IId):

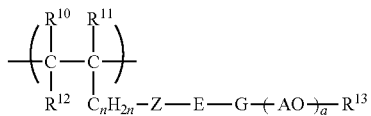
(IIa)

in which
$R^{10}$, $R^{11}$ and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2\text{---}C_6H_{10}$, 1,2-phenylene, 1,3-phenylene, or 1,4-phenylene;
G is O, NH or CO—NH; or
E and G together are a chemical bond;
A is $C_xH_{2x}$ with x=2, 3, 4 or 5, or $CH_2CH(C_6H_5)$;
n is 0, 1, 2, 3, 4 and/or 5;
a is an integer from 2 to 350;
$R^{13}$ is H, an unbranched or branched $C_1$-$C_4$ alkyl group, $CO\text{---}NH_2$ and/or $COCH_3$;

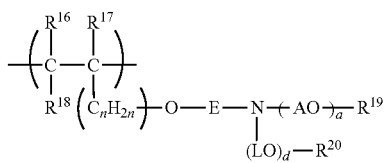
(IIb)

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2\text{---}C_6H_{10}$, 1,2-phenylene, 1,3-phenylene, or 1,4-phenylene, or is a chemical bond;
A is $C_xH_{2x}$ with x=2, 3, 4 or 5, or $CH_2CH(C_6H_5)$;
L is $C_xH_{2x}$ with x=2, 3, 4 or 5, or $C_xCH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched or branched $C_1$-$C_4$ alkyl group; and
n is 0, 1, 2, 3, 4 or 5;

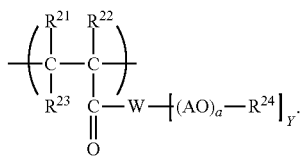
(IIc)

in which
$R^{21}$, $R^{22}$ and e independently of one another are H or an unbranched or branched $C_1$-$C_4$ alkyl group;
W is O, $NR^{25}$, or N;
Y is 1 if W=O or $NR^{25}$, and is 2 if W=N;
A is $C_xH_{2x}$ with x=2, 3, 4 or 5, or $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

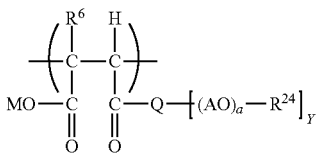
(IId)

in which
R$^6$ is H or an unbranched or branched C$_1$-C$_4$ alkyl group;
Q is NR$^{10}$, N or O;
Y is 1 if Q=O or NR$^{10}$, and is 2 if Q=N;
R$^{10}$ is H or an unbranched or branched C$_1$-C$_4$ alkyl group;
A is C$_x$H$_{2x}$ with x=2, 3, 4 or 5, or CH$_2$C(C$_6$H$_5$)H;
R$^{24}$ is H or an unbranched or branched C$_1$-C$_4$ alkyl group;
M is H or one cation equivalent; and
a is an integer from 2 to 350.

According to one embodiment, the polymeric dispersant comprises as its polyether side chain:
(a) at least one structural unit of the formula (IIa) in which R$^{10}$ and R$^{12}$ are H, R$^{11}$ is H or CH$_3$, E and G together are a chemical bond, A is C$_x$H$_{2x}$ with x=2 and/or 3, a is 3 to 150, and R$^{13}$ is H or an unbranched or branched C$_1$-C$_4$ alkyl group; and/or
(b) at least one structural unit of the formula (IIb) in which R$^{16}$ and R$^{18}$ are H, R$^{17}$ is H or CH$_3$, E is an unbranched or branched C$_1$-C$_6$ alkylene group, A is C$_x$H$_{2x}$ with x=2 and/or 3, L is C$_x$H$_{2x}$ with x=2 and/or 3, a is an integer from 2 to 150, d is an integer from 1 to 150, R$^{19}$ is H or an unbranched or branched C$_1$-C$_4$ alkyl group, and R$^{20}$ is H or an unbranched or branched C$_1$-C$_4$ alkyl group; and/or
(c) at least one structural unit of the formula (IIc) in which R$^{21}$ and R$^{23}$ are H, R$^{22}$ is H or CH$_3$, A is C$_x$H$_{2x}$ with x=2 and/or 3, a is an integer from 2 to 150, and R$^{24}$ is H or an unbranched or branched C$_1$-C$_4$ alkyl group; and/or
(d) at least one structural unit of the formula (IId) in which R$^6$ is H, Q is O, R$^7$ is (C$_n$H$_{2n}$)—O-(AO)$_\alpha$—R$^9$, n is 2 and/or 3, A is C$_x$(H$_{2x}$), with x=2 and/or 3, α is an integer from 1 to 150, and R$^9$ is H or an unbranched or branched C$_1$-C$_4$ alkyl group.

According to a further embodiment, the polymeric dispersant comprises at least one structural unit of the formula (IIa) and/or (IIc).

According to a further embodiment, the polymeric dispersant comprises a polycondensate which comprises at least one aromatic or heteroaromatic structural unit having a polyether side chain, and at least one aromatic or heteroaromatic structural unit having at least one phosphoric ester group or a salt thereof.

According to a further embodiment, the polymeric dispersant comprises at least one polycondensation product which comprises structural units (III) and (IV):

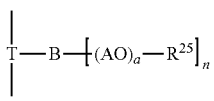
(III)

in which
T is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and that n is 1 if B is NH or O;
A is C$_x$H$_{2x}$ with x=2, 3, 4 or 5, or CH$_2$CH(C$_6$H$_5$);
a is an integer from 1 to 300;
R$^{25}$ is H, an unbranched or branched C$_1$ to C$_{10}$ alkyl radical, C$_5$ to C$_8$ cycloalkyl radical, aryl radical, or heteroaryl radical having 5 to 10 ring atoms, of which 1 or 2 atoms are heteroatoms selected from N, O and S, and preferably is H;
the structural unit (IV) being selected from the structural units (IVa) and (IVb):

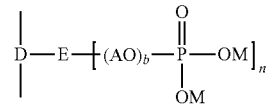
(IVa)

in which
D is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O and S;
E is N, NH or O, with the proviso that m is 2 if E is N and that m is 1 if E is NH or O;
A is C$_x$H$_{2x}$ with x=2, 3, 4 or 5, or CH$_2$CH(C$_6$H$_5$);
b is an integer from 1 to 300;
M independently at each occurrence is H or one cation equivalent;

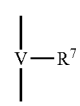
(IVb)

in which
V is a substituted or unsubstituted phenyl radical, or is a substituted or unsubstituted naphthyl radical; R$^7$ is COOM, OCH$_2$COOM, SO$_3$M or OPO$_3$M$_2$;
M is H or one cation equivalent;
the aforementioned phenyl, naphthyl or heteroaromatic radicals are optionally substituted by 1 or two radicals selected from R$^8$, OH, OR$^8$, (CO)R$^8$, COOM, COOR$^8$, SO$_3$R$^8$ and NO$_2$; and
R$^8$ is C$_1$-C$_4$ alkyl, phenyl, naphthyl, phenyl-C$_1$-C$_4$ alkyl or C$_1$-C$_4$ alkyl-phenyl.

According to a further embodiment, T is a substituted or unsubstituted phenyl radical or naphthyl radical, E is NH or O, A is C$_x$H$_{2x}$ with x=2 and/or 3, a is an integer from 1 to 150, and R$^{25}$ is H or a branched or unbranched C$_1$ to C$_{10}$ alkyl radical.

According to a further embodiment, D is a substituted or unsubstituted phenyl radical or naphthyl radical, E is NH or O, A is C$_x$H$_{2x}$ with x=2 and/or 3, and b is an integer from 1 to 150.

According to a further embodiment, T and/or D are phenyl or naphthyl which is substituted by 1 or 2 C$_1$-C$_4$ alkyl, hydroxyl or 2 C$_1$-C$_4$ alkoxy groups.

According to a further embodiment, V is phenyl or naphthyl which is substituted by 1 or 2 C$_1$-C$_4$ alkyl, OH, OCH$_3$ or COOM, and R$^7$ is COOM or OCH$_2$COOM.

According to a further embodiment, the polycondensation product comprises a further structural unit (V) of the formula

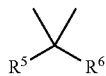

(V)

in which
R⁵ and R⁶ may be identical or different and are H, $CH_3$, COOH or a substituted or unsubstituted phenyl or naphthyl group or a substituted or unsubstituted heteroaromatic group having 5 to 10 ring atoms, of which 1 or 2 atoms are heteroatoms selected from N, O and S, or R⁵ and R⁶ may be identical or different and are H, $CH_3$, or COOH, more particularly H, or one of the radicals R⁵ and R⁶ is H and the other is $CH_3$.

According to a further embodiment, the polymeric dispersant comprises:
structural units of the formulae (I) and (II), more particularly of the formulae (Ia) and (IIa); or
structural units of the formulae (Ia) and (IIc); or
structural units of the formulae (Ic) and (IIa); or
structural units of the formulae (Ia), (Ic) and (IIa).

According to a further embodiment, the polymeric dispersant is composed of (i) structural units having anionic or anionogenic groups, derived from acrylic acid, methacrylic acid, maleic acid, hydroxyethyl acrylate phosphoric ester, and/or hydroxyethyl methacrylate phosphoric ester, hydroxyethyl acrylate phosphoric diester and/or hydroxyethyl methacrylate phosphoric diester, and (ii) polyether side chain structural units derived from $C_1$-$C_4$ alkyl-polyethylene glycol acrylic ester, polyethylene glycol acrylic ester, $C_1$-$C_4$ alkyl-polyethylene glycol methacrylic ester, polyethylene glycol methacrylic ester, $C_1$-$C_4$ alkyl-polyethylene glycol acrylic ester, polyethylene glycol acrylic ester, vinyloxy-$C_2$-$C_4$ alkylene-polyethylene glycol, vinyloxy-$C_2$-$C_4$ alkylene-polyethylene glycol $C_1$-$C_4$ alkyl ether, allyloxy-polyethylene glycol, allyloxy-polyethylene glycol $C_1$-$C_4$ alkyl ether, methallyloxy-polyethylene glycol, methallyloxy-polyethylene glycol $C_1$-$C_4$ alkyl ether, isoprenyloxy-polyethylene glycol and/or isoprenyloxy-polyethylene glycol $C_1$-$C_4$ alkyl ether.

According to a further embodiment, the polymeric dispersant is composed of structural units (i) and (ii) derived from
(i) hydroxyethyl acrylate phosphoric ester and/or hydroxyethyl methacrylate phosphoric ester and (ii) $C_1$-$C_4$ alkyl-polyethylene glycol acrylic ester and/or $C_1$-$C_4$ alkyl-polyethylene glycol methacrylic ester; or
(i) acrylic acid and/or methacrylic acid and (ii) $C_1$-$C_4$ alkyl-polyethylene glycol acrylic ester and/or $C_1$-$C_4$ alkyl-polyethylene glycol methacrylic ester; or
(i) acrylic acid, methacrylic acid and/or maleic acid and (ii) vinyloxy-$C_2$-$C_4$ alkylene-polyethylene glycol, allyloxy-polyethylene glycol and/or isoprenyloxy-polyethylene glycol.

According to a further embodiment, the polymeric dispersant is composed of structural units (i) and (ii) derived from
(i) hydroxyethyl methacrylate phosphoric ester and (ii) $C_1$-$C_4$ alkyl-polyethylene glycol methacrylic ester or polyethylene glycol methacrylic ester; or (i) methacrylic acid and (ii) $C_1$-$C_4$ alkyl-polyethylene glycol methacrylic ester or polyethylene glycol methacrylic ester; or
(i) acrylic acid and maleic acid and (ii) vinyloxy-$C_2$-$C_4$ alkylene-polyethylene glycol or
(i) acrylic acid and maleic acid and (ii) isoprenyloxy-polyethylene glycol or
(i) acrylic acid and (ii) vinyloxy-$C_2$-$C_4$ alkylene-polyethylene glycol or
(i) acrylic acid and (ii) isoprenyloxy-polyethylene glycol or
(i) acrylic acid and (ii) methallyloxy-polyethylene glycol or
(i) maleic acid and (ii) isoprenyloxy-polyethylene glycol or
(i) maleic acid and (ii) allyloxy-polyethylene glycol or
(i) maleic acid and (ii) methallyloxy-polyethylene glycol.

According to a further embodiment, the molar ratio of the structural units (I):(II) is 1:4 to 15:1, more particularly 1:1 to 10:1, and/or the molar ratio of the structural units (III):(IV) is 4:1 to 1:15, more particularly 2:1 to 1:10.

According to a further embodiment, the polymeric dispersant is composed of structural units of the formulae (III) and (IV) in which T and D are phenyl or naphthyl, the phenyl or naphthyl being optionally substituted by 1 or 2 $C_1$-$C_4$ alkyl, hydroxy or 2 $C_1$-$C_4$ alkoxy groups, B and E are O, A is $C_xH_{2x}$ with x=2, a is 3 to 150, more particularly 10 to 150, and b is 1, 2 or 3.

According to a further embodiment, the molar ratio of calcium to silicon in the calcium silicate hydrate particles is 0.6 to 2, preferably 0.8 to 1.8, more preferably 0.9 to 1.6, especially preferably 1.0 to 1.5.

The average molecular weight $M_w$ of the polymer, as determined by gel permeation chromatography (GPC), is preferably 5000 to 200 000 g/mol, more preferably 10 000 to 80 000 g/mol, and very preferably 20 000 to 70 000 g/mol. The average molecular weight of the polymers and conversion were analyzed by means of GPC (column combinations: OH-Pak SB-G, OH-Pak SB 804 HQ and OH-Pak SB 802.5 HQ from Shodex, Japan; eluent: 80 vol % aqueous solution of $HCO_2NH_4$ (0.05 mol/l) and 20 vol % acetonitrile; injection volume 100 µl; flow rate 0.5 ml/min). Calibration for determining the average molar mass took place using linear poly(ethylene oxide) and polyethylene glycol standards. As a measure of the conversion, the peak of the copolymer is standardized to a relative height of 1, and the height of the peak of the unreacted macromonomer/PEG-containing oligomer is used as a measure of the residual monomer content.

The polymeric dispersant preferably fulfils the requirements of industrial standard EN 934-2 (February 2002).

The C-S-H as per WO 2014/114784 is prepared by reaction of at least one sulfonic acid compound of the formula

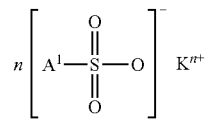

in which
$A^1$ is $NH_2$, NHMe, $NMe_2$, $N(CH_2-CH_2-OH)_2$, $CH_3$, $C_2H_5$, $CH_2-CH_2-OH$, phenyl or p-$CH_3$-phenyl, and
$K^{n+}$ is $Ca^{2+}$, and n stands for the valence of the cation,
with at least one water-soluble inorganic silicate compound in the presence of an aqueous solution of a polymeric dispersant, the silicate compound and the polymeric dispersant being defined as for the preparation of the C-S-H as per WO 2010/026155.

Further features of the C-S-H suspensions and measures for producing them are described in WO 2010/026155, especially pages 8 to 10 and 23 to 27, and also in WO 2014/114784, especially pages 26 to 35. The disclosure content of these publications and especially the disclosure content of the pages indicated are made part of the content of the present specification.

In a further embodiment of the invention, the reaction is carried out at least partly in the presence of an aqueous solution which comprises a viscosity-increasing polymer from the group of the polysaccharide derivatives and/or (co)polymers having an average molecular weight Mw of more than 500 000 g/mol, more preferably more than 1 000 000 g/mol, the (co)polymers comprising structural units derived (preferably by radical polymerization) from nonionic (meth)acrylamide monomer derivatives and/or sulfonic acid monomer derivatives. The C-S-H of the invention therefore optionally comprises viscosity-increasing polymers of these kinds. The viscosity-increasing polymer may be added at the beginning, during the method, or at the end of the method. Hence it may be added, for example, to the aqueous solution of the comb polymer, to the calcium compound and/or to the silicate compound. The viscosity-increasing polymer may also be used during the method for producing a hardening accelerator composition by reaction of a calcium compound, preferably a calcium salt, very preferably a water-soluble calcium salt, with a component containing silicon dioxide. The viscosity-increasing polymer is preferably added after the end of the reaction (after the end of the addition of the reactants), to prevent destabilization of particles and to retain the best stability. The viscosity-increasing agent therefore has a stabilizing function in that segregation (aggregation and sedimentation) of calcium silicate hydrate, for example, may be prevented. The viscosity-increasing agents are used preferably at a level of 0.001 to 10 wt % and more preferably 0.001 to 1 wt %, based on the weight of the hardening accelerator suspension. The viscosity-increasing polymer ought preferably to be metered so as to result in a plastic viscosity on the part of the hardening accelerator suspensions of more than 80 mPa·s.

Preferred polysaccharide derivatives are cellulose ethers, examples being alkylcelluloses such as methylcellulose, ethylcellulose, propylcellulose and methylethylcellulose, hydroxyalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxyethylcellulose (HEC) and ethylhydroxyethylcellulose (EHEC), and particular preference to methylhydroxyethylcelluose (MHEC) and methylhydroxypropylcelluose (MHPC). The above cellulose ether derivatives, each obtainable by corresponding alkylation and alkoxylation of cellulose, are preferably in the form of nonionic structures, though it would also be possible to use carboxymethylcellulose (CMC), for example. Preference is given, moreover, to the use of nonionic starch ether derivatives such as hydroxypropylstarch, hydroxyethylstarch and methylhydroxypropylstarch. Hydroxypropylstarch is preferred. Also preferred are microbially produced polysaccharides such as welan gum and/or xanthans, and naturally occurring polysaccharides such as alginates, carrageenans and galactomannans. They can be obtained from corresponding nature products by extractive methods, such as from algae in the case of alginates and carrageenans and from carob seeds in the case of galactomannans.

The viscosity-increasing (co)polymers having a weight-average molecular weight MW of more than 500 000 g/mol, more preferably more than 1 000 000 g/mol, may be prepared (preferably by radical polymerization) from nonionic (meth)acrylamide monomer derivatives and/or sulfonic acid monomer derivatives. The respective monomers may be selected, for example, from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide, and/or sulfonic acid monomer derivatives from the group of styrenesulfonic acid, 2-acrylamido-2-methylpropanesulfonic acid, 2-methacrylamido-2-methylpropanesulfonic acid, 2-acrylamidobutanesulfonic acid and/or 2-acrylamido-2,4,4-trimethylpentanesulfonic acid, or the salts of the stated acids. The viscosity-increasing agent preferably comprises more than 50 mol % and more preferably more than 70 mol % of structural units which derive from nonionic (meth)acrylamide monomer derivatives and/or sulfonic acid monomer derivatives. Other structural units present preferably in the copolymers may be derived, for example, from the monomers (meth)acrylic acid, esters of (meth)acrylic acids with branched or unbranched $C_1$ to $C_{10}$ alcohols, vinyl acetate, vinyl propionate and/or styrene.

In a further embodiment of the invention, the viscosity-increasing polymer is a polysaccharide derivative from the group of methylcellulose, hydroxyethylcellulose (HEC), hydroxypropylcellulose (HPC), methylhydroxyethylcellulose (MHEC), methylhydroxypropylcellulose (MHPC) and/or (co)polymers having a weight-average molecular weight Mw of more than 500 000 g/mol, more preferably more than 1 000 000 g/mol, the (co)polymers comprising structural units which derive (preferably by radical polymerization) from nonionic (meth)acrylamide monomer derivatives from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide, and/or sulfonic acid monomer derivatives from the group of 2-acrylamido-2-methylpropanesulfonic acid, 2-methacrylamido-2-methylpropanesulfonic acid, 2-acrylamidobutanesulfonic acid and/or 2-acrylamido-2,4,4-trimethylpentanesulfonic acid, or the salts of the stated acids.

In the group of the nonionic (meth)acrylamide monomer derivatives, preference is given to methylacrylamide, N,N-dimethylacrylamide and/or methacrylamide, and very particular preference to acrylamide. In the group of the sulfonic acid monomers, preference is given to 2-acrylamido-2-methylpropanesulfonic acid (AMPS) and salts thereof. The viscosity-increasing polymers may be added at the start of the method or at any other point in time.

Step (b)

The C-S-H suspension obtained after stage (a) is then mixed with a calcium compound. The mixing is accomplished in a conventional manner, as for example by addition of the calcium compound in solid form with stirring, or by addition of the calcium compound in the form of a solution or suspension, and mixing with the C-S-H suspension.

The amount of calcium compound is generally in the range of 0.5 to 150 wt % or 0.5 to 120 wt % or 0.5 to 60 wt %, preferably 1 to 30 wt %, more preferably 1 to 20 wt %, in particular 1 to 10 wt % or 1 to 5 wt %, based on the solids content of the hardening accelerator suspension from step (a). If the calcium compound is added in the form of a solution or suspension, the concentration of the calcium compound in the solution or suspension in generally in the range from 5 to 50 wt %, based on the total weight of the Ca-containing solution or suspension.

Preferred calcium compounds are calcium acetate, calcium formate, calcium hydroxide, calcium oxide, and mixtures of two or more of said compounds. Also suitable are calcium salts having a water solubility of 0.5 g/l, such as calcium hydrogencarbonate, calcium bromide, calcium citrate, calcium chloride, calcium gluconate, calcium iodate, calcium iodide, calcium lactate, calcium nitrate, calcium nitrite, calcium propionate, calcium sulfate, calcium sulfate hemihydrate, calcium sulfate dihydrate, calcium sulfamate, calcium methanesulfonate, or mixtures of two or more of these compounds.

According to one embodiment, the calcium compound is selected from calcium sulfamate, calcium methanesulfonate, calcium formate, calcium acetate, calcium hydroxide, calcium oxide, calcium sulfate dihydrate, calcium sulfate hemihydrate, or mixtures of two or more of these compounds.

According to a further embodiment, the calcium compound is calcium sulfamate, calcium methanesulfonate, or a mixture thereof.

According to a further embodiment, the calcium compound is calcium formate, calcium acetate, calcium hydroxide, calcium oxide, or a mixture thereof.

According to a further embodiment, the calcium compound is calcium formate, calcium acetate or a mixture thereof.

According to a further embodiment, the calcium compound is calcium hydroxide, calcium oxide or a mixture thereof.

The calcium salt such as calcium formate or calcium acetate, can also be added to the C-S-H-comprising hardening accelerator suspension in a two-stage operation, by admixing the suspension from stage (a) with calcium hydroxide and/or calcium oxide, and then adding an acid, such as formic acid or acetic acid. The acid may be added in equivalent amount, in a molar excess or in a molar deficit.

Step (c)

The mixture obtained from stage (b) may be dried in a customary way. Suitable drying methods are drying in a forced-air drying cabinet, fluidized-bed drying, spray drying, or contact drying. Drying is accomplished preferably by spray drying or contact drying, such as roll drying.

All conventional spraying devices are suitable in principle for implementing the spray drying. It is useful to use rotating atomizer disks (4000-50 000 revolutions/min), in which case the material to be dried is introduced into a stream of hot air which dries it to a fine powder in a very short time. The spraying device may be operated on the co-current principle or the counter-current principle, and continuously or discontinuously. The spraying facility is located preferably at the top part of a spraying tower. In this case the dried material produced is separated, for example, by a cyclone separator from the stream of air, and can be taken off at this point.

A further suitable nebulization technology are spraying nozzles like single-fluid nozzles and also multichannel nozzles such as two-fluid nozzles, three-channel nozzles, or four-channel nozzles. Such nozzles may also be designed as what are called "ultrasound nozzles". Nozzles of these kinds are available commercially.

Furthermore, according to nozzle type, an atomizing gas may also be supplied. Atomizing gas used may be air or an inert gas such as nitrogen, carbon dioxide, carbon monoxide, argon, or mixtures thereof. The gas pressure of the atomizing gas may be up to 1 MPa absolute, preferably 0.12 to 0.5 MPa absolute.

Ultrasound nozzles may be operated with or without atomizing gas. In the case of ultrasound nozzles, atomizing comes about by the phase to be atomized being set in vibration. Depending on nozzle size and design, the ultrasound nozzles may be operated with a frequency of 16 to 120 kHz.

The throughput per nozzle of liquid phase for spraying is dependent on the nozzle size. The throughput may be, for example, 500 g/h to 1500 kg/h of solution or suspension. In the production of commercial quantities, the throughput is preferably in the range from 10 to 1500 kg/h.

If no atomizing gas is used, the liquid pressure may be 0.2 to 40 MPa absolute. If an atomizing gas is used, the liquid may be supplied unpressurized.

Furthermore, the spray drying device is supplied with a drying gas such as air or one of the inert gases mentioned. The drying gas may be supplied co-currently with or counter-currently to the sprayed liquid, preferably co-currently. The entry temperature of the drying gas may be 120 to 300° C., preferably 150 to 230° C., the exit temperature 60 to 135° C., preferably 80 to 120° C.

The spraying process is preferably operated such that the average droplet size of the sprayed phases is 5 to 2000 µm, preferably 5 to 500 µm, more preferably 5 to 200 µm. The average droplet size may be determined by laser diffraction or high-speed cameras coupled with an image analysis system.

In an alternative embodiment, the components are sprayed through a multichannel nozzle, with the components being contactable with one another at the outlet of the spraying nozzle. The multichannel nozzle may preferably be a three-channel nozzle or else a two-channel nozzle.

It is possible optionally to add spraying assistants, such as silicon dioxide, calcium carbonate, magnesium carbonate, calcium/magnesium carbonate (dolomite), iron oxides, zirconium oxides, titanium dioxide, aluminum oxides, phyllosilicates, kaolin, talc, gypsum, or starch.

Contact drying takes place in general at temperatures in the range from 100 to 250° C.

Drying takes place in general until the water content of the product is from 0.1 to 5 wt %, preferably 0.5 to 3 wt %, based on the total weight of the dried product. This water content is determined by drying of the powder to constant weight at 105° C. and determination of the residual mass in relation to the original mass of the dried product.

Calcium Silicate Hydrate in Powder Form

The invention also relates to the C-S-H-comprising hardening accelerator in powder form that is obtainable by the method of the invention. The powder possesses an average particle size (d(50)) in the range from 1 to 300 µm, preferably 2 to 70 µm, more preferably 5 to 60 µm, as determined by means of static light scattering in a stream of air (e.g., using Mastersizer 2000, from Malvern).

Surprisingly, the hardening accelerator of the invention brings about acceleration of the hardening of hydraulic and/or latent binders, such as cement, to an extent comparable with that achieved using a C-S-H suspension. Achieved in particular in this context is an acceleration of the developmental strength within the first 48 hours, preferably within the first 24 hours, more preferably within the first 12 hours following addition of water. The hardening of the hydraulic and/or latent binders, such as cement, is correlated here with the development of the heat of hydration, measurable by means of isothermal heat flow calorimetry. The correlation between heat of hydration and strength formation of a cement is known in the literature (for example: oral presentation by L. Frølich Engsig: Using isothermal calorimetry to predict early mortar strength. Meeting on Applications of Isothermal calorimetry in the Cement Industry. TU Berlin, 10.-15. Apr. 2014).

It was surprising, moreover, that the C-S-H of the invention possesses better redispersibility in comparison to C-S-H produced without the addition of a calcium compound prior to drying.

The invention also relates to the use of the C-S-H of the invention in building material mixtures, especially those which comprise a hydraulic or latent hydraulic binder.

The invention also relates to the use of a calcium compound as defined above in the drying of calcium silicate hydrate suspensions (drying aid).

The invention further relates to a building material mixture which comprises the C-S-H of the invention and optionally a hydraulic and/or latent hydraulic binder. Hydraulic or latent hydraulic binders are, in particular, cement clinker containing binders such as cements of classes I to V, in particular ordinary Portland cement.

For the purposes of the present invention, a "latent hydraulic binder" is preferably a binder in which the molar ratio (CaO+MgO): $SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 500 $m^2$ $kg^{-1}$. Finer milling gives higher reactivity. For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X-ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2$ $g^{-1}$.

Microsilica is a by-product of silicon production or ferrosilicon production, and likewise consists mostly of amorphous $SiO_2$ powder. The particles have diameters of the order of magnitude of 0.1 µm. Specific surface area is of the order of magnitude of from 15 to 30 $m^2$ $g^{-1}$.

In contrast to this, commercially available quartz sand is crystalline and has comparatively large particles and comparatively small specific surface area. It serves as inert filler in the invention.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

For the purposes of the present invention, aluminosilicates are the above mentioned reactive compounds based on $SiO_2$ in conjunction with $Al_2O_3$ which harden in an aqueous alkali environment. It is of course not essential here that silicon and aluminium are present in oxidic form, as is the case by way of example in $Al_2Si_2O_7$. However, for the purposes of quantitative chemical analysis of aluminosilicates it is usual to state the proportions of silicon and aluminium in oxidic form (i.e. as "$SiO_2$" and "$Al_2O_3$").

Further, calcium sulfate dihydrate, hemihydrate or anhydrite, calcined oil shale, calcium sulfoaluminate cement and/or calcium aluminate cement, may be added to the building material mixture.

The hardening accelerator of of the invention is present in the building material mixtures in general in an amount of 0.01 to 10 wt %, more particularly 0.05 to 5 wt %, based on hydraulic or latent hydraulic binder.

The building material mixture of the invention may also comprise further additives typically used in the field of construction chemicals, such as other hardening accelerators, dispersants, plasticizers, water reducers, solidification retardants, defoamers, air entrainers, retarders, shrinkage reducers, redispersible polymer powders, frost preventatives and/or antiefflorescence agents.

Suitable other hardening accelerators are alkanolamines, preferably triisopropanolamine and/or tetrahydroxyethylethylenediamine (THEED). The alkanolamines are used preferably at a level of 0.01 to 2.5 wt %, based on the weight of the hydraulic binder. When amines are used, especially triisopropanolamine and tetrahydroxyethylethylenediamine, synergistic effects may be found with regard to the development of early strength by hydraulic binder systems, especially cementitious systems.

Examples of suitable dispersants, plasticizers, and water reducers are as follows: a) sulfonated melamine-formaldehyde condensates, b) lignosulfonates, c) sulfonated ketone-formaldehyde condensates, d) sulfonated naphthalene-formaldehyde condensates (BNS), e) polycarboxylate ethers (PCE), f) nonionic copolymers for extending the processing life of a cementitious mixture comprising cement and water, the copolymer comprising units derived from at least the following monomer components: component A, being an ethylenically unsaturated carboxylic ester monomer having a unit which is hydrolyzable in the cementitious mixture; and component B, being an ethylenically unsaturated carboxylic ester monomer or alkenyl ether monomer, comprising at least one poly-$C_{24}$ oxyalkylene side chain having 1 to 350 oxyalkylene units, or g) dispersants containing phosphonate groups, of the formula

$$R—(OA)_n\text{-}N—[CH_2—PO(OM_2)_2]_2$$

in which
R is H or a saturated or unsaturated hydrocarbon radical, preferably a $C_1$ to $C_{15}$ alkyl radical;
A may be identical or different and is alkylenes having 2 to 18 carbon atoms, preferably ethylene and/or propylene, more particularly ethylene;
n is 5 to 500, preferably 10 to 200, more particularly 10 to 100; and
M is H, an alkali metal, 1/2 alkaline earth metal and/or an amine,
with any combination of the stated dispersants a) to g) being encompassed.

Suitable solidification retardants are citric acid, tartaric acid, gluconic acid, phosphonic acid, aminotrimethylenephosphonic acid, ethylenediaminotetra-(methylenephosphonic) acid, diethylenetriaminopenta(methylenephosphonic) acid, in each case including the respective salts of the acids, pyrophosphates, pentaborates, metaborates and/or sugars (e.g., glucose, molasses). The advantage of adding solidification retardants is that the open time can be controlled and, in particular, can optionally be extended. The solidification retardants are used preferably at a level of 0.01 to 0.5 wt %, based on the weight of the hydraulic binder, preferably cement.

The examples hereinafter illustrate the invention without limiting it.

COMPARATIVE EXAMPLE

A C-S-H suspension was prepared in accordance with WO 2014/114784, example H2, with a calcium source being prepared by dissolving 122 g of amidosulfuric acid (purity 99%) in 288.7 g of $H_2O$ and then slowly adding 46.7 g of $Ca(OH)_2$ (purity 95%). A silicate source was prepared by dissolving 104.9 g of sodium metasilicate pentahydrate (purity 99%) in 109.7 g of $H_2O$. A dispersant solution was prepared by weighing out 82.8 g of a 45 wt % strength solution of a comb polymer (based on the monomers maleic acid, acrylic acid and vinyloxybutyl-polyethylene glycol 5800; the molar ratio of acrylic acid to maleic acid is 7; Mw=40 000 g/mol, determined via GPC; the solids content is 45 wt %; the synthesis is described in EP 089 4811, for example; the charge density is 930 μeq/g) and 245.1 g of $H_2O$. The dispersant solution was introduced as an initial charge and was pumped in circulation through a high-energy mixer with a 20 ml mixing volume furnished with a rotor/stator system. In the high-energy mixer, the calcium source and the silicate source are metered completely into the initial-charge solution within 80 minutes, with the rotor/stator system at a rotary speed of 8000 rpm. The initial charge is maintained at 20° C. This suspension was adjusted to a solids content of 25 mass %.

The performance of the suspensions was ascertained by metering 1% suspension solids, based on cement (Mergelstetten CEM I 42.5 N, Schwenk Zement) and determining the influence by means of isothermal heat flow calorimetry as in WO 2014/114784, page 39. The C-S-H-based accelerator suspension has a cumulative heat after 6 hours of 22.55 J/g, measured at 20° C.

The suspension was subsequently dried at 230° C. entry temperature and 98° C. exit temperature by means of spray drying under inert conditions ($N_2$ atmosphere) in a Mobile Minor type MM-I laboratory spray dryer from GEA Niro.

For comparable metering of solid material, verification of the performance gave a cumulative heat after 6 hours at 17.23 J/g. Accordingly, the loss of performance, determined via the cumulative heat, is approximately 24%.

EXAMPLES

To produce the inventive powders, the original suspension was admixed, prior to drying, with different calcium compounds and different masses of calcium compounds. The suspension was thereafter stirred for 10 minutes and then dried by means of spray drying, at 230° C. entry temperature and 98° C. exit temperature, under inert conditions ($N_2$ atmosphere) on a Mobile Minor type MM-I laboratory spray dryer from GEA Niro. For comparison, for each powder obtained from the original suspension mixed with Ca compound, a physical mixture of the Ca compound and the dried C-S-H was produced. All of the powders have their acceleration performance verified by means of heat flow calorimetry. For the determination of the hydration kinetics by means of heat flow calorimetry, therefore, 1 g of each C-S-H powder (corresponding to the solid of the original suspension from step (a)) plus, where appropriate, calcium compound was mixed with 100 g of cement (Mergelstetten CEM I 42.5 N) at a w/c ratio of 0.45 for 30 seconds by means of an overhead stirrer (IKA Labortechnik, RW20.n) at 500 rpm in a 200 ml beaker. For the blank value, no C-S-H was added. For the "C-S-H suspension" comparison, the hardening accelerator was used as C-S-H suspension. For the "C-S-H powder" comparison, a C-S-H powder obtained without adding a calcium compound during drying was used. For the inventive examples, the percentage amount of calcium compound indicated in table 1 was added prior to drying. For the physical mixtures, the same percentage amount of calcium compound was mixed with 1 g of C-S-H powder dried without calcium compound.

In order to characterize the acceleration performance, the cumulative heat (HoH, Heat of Hydration) was determined after 6 hours (at 20° C.), and the acceleration factor was ascertained from the slope of the heat flow curves. The acceleration factor (AF) was determined as follows:

1. determination of the maximum slope ($m_{max}$) between 1 h and 6 h over the 1st derivation of the heat flow curve after the hydration time in this time interval
2. ratio of the maximum slope between reference and sample $$AF = m_{max}(\text{sample})/m_{max}(\text{reference})$$

The results are compiled in table 1 below. Surprisingly it emerges that adding a Ca salt prior to spray drying causes substantially no loss of performance on the part of the C-S-H powders of the invention, in contrast to the comparative powders.

A further aspect of the invention is the influencing of the rate of redispersion. For this purpose, a powder with 15% addition of calcium hydroxide prior to drying was prepared (example 4), and the performance of the powder was compared with that of a powder without addition of salt added (C-S-H powder without addition of salt) after different batching times. For the determination of the hydration kinetics by means of heat flow calorimetry, the C-S-H powder was mixed with 100 g of cement (Mergelstetten CEM I 42.5 N) at a w/c ratio of 0.45 by means of an overhead stirrer (IKA Labortechnik, RW20.n) at 500 rpm in a 200 ml beaker for different mixing times (30, 60, 90 and 120 seconds). The results are compiled in table 2 below.

It is apparent that the addition of a calcium compound prior to spray drying means that the resulting powders no longer suffer substantially any loss of performance, in contrast to a mere physical mixture; see table 1.

Table 2 shows that the powder of the invention co-spray-dried with a calcium compound has a redispersibility which is a significant improvement over the prior art. Even short incorporation times of 30 seconds are already enough to obtain the full performance of the powder. In contrast, even after a relatively long batching time, specimens produced in accordance with the prior art exhibit an activity which is a sharp reduction on that of the original suspension.

TABLE 1

| | | | Co-dried C—S—H powder (invention) | | Physical mixture (comparative) | |
|---|---|---|---|---|---|---|
| | Calcium compound | Calcium compound (mass %)[1] | HoH after 6 h (J/g cement) | Acceleration factor | HoH after 6 h (J/g cement) | Acceleration factor |
| Blank mixture | None (cement only) | | 8.08 | 1.00 | | |
| Comparative C—S—H suspension | None | | 22.55 | 2.61 | | |
| Comparative C—S—H powder | None | | 17.23 | 1.42 | | |
| Example 1 | Ca(OH)$_2$ | 1 | 19.68 | 2.03 | 17.15 | 1.46 |
| Example 2 | Ca(OH)$_2$ | 5 | 23.47 | 2.74 | 17.19 | 1.42 |
| Example 3 | Ca(OH)$_2$ | 10 | 23.02 | 2.62 | 18.28 | 1.83 |
| Example 4 | Ca(OH)$_2$ | 15 | 22.84 | 2.58 | 17.54 | 1.48 |
| Example 5 | Ca amidosulfonate | 1 | 17.75 | 1.57 | 17.66 | 1.57 |
| Example 6 | Ca amidosulfonate | 5 | 19.80 | 1.96 | 17.57 | 1.53 |
| Example 7 | Ca amidosulfonate | 10 | 20.80 | 2.14 | 17.33 | 1.60 |
| Example 8 | Ca amidosulfonate | 15 | 21.88 | 2.33 | 18.08 | 1.60 |
| Example 9 | CaCl$_2$ | 5 | 22.15 | 2.50 | 18.18 | 1.46 |
| Example 10 | Ca methanesulfonate | 5 | 19.97 | 2.02 | 18.134 | 1.62 |
| Example 11 | Ca acetate | 5 | 21.72 | 2.24 | 19.19 | 1.68 |
| Example 12 | Ca formate | 5 | 20.85 | 2.11 | 17.68 | 1.46 |

[1] based on the solids content of the original suspension
[2] based on 100 g cement

TABLE 2

| Sample | Incorporation time (stirring with Ika mixer) | Acceleration factor | HoH after 6 h (J/g cement) |
|---|---|---|---|
| Cement only | 30 s | 1.00 | 8.08 |
| Accelerator suspension | 30 s | 2.46 | 22.55 |
| Example 4 | 30 s | 2.74 | 23.47 |
| Example 4 | 60 s | 2.69 | 23.36 |
| Example 4 | 90 s | 2.73 | 23.23 |
| Comparative C—S—H powder (without calcium compound) | 30 s | 1.59 | 17.23 |
| Comparative C—S—H powder (without calcium compound) | 60 s | 1.64 | 18.45 |
| Comparative C—S—H powder (without calcium compound) | 90 s | 1.75 | 18.94 |
| Comparative C—S—H powder (without calcium compound) | 120 s | 1.89 | 19.08 |

Example 13

Raw Materials for Synthesis:

| Abbreviation | Name | Formula | Purity |
|---|---|---|---|
| ASA | amidosulfonic acid | H$_3$NSO$_3$ | 100% |
| CH | calcium hydroxide | Ca(OH)$_2$ | 98% |
| NaSi | sodium metasilicate pentahydrate | Na$_2$SiO$_3$·5H$_2$O | 99% |

The polymer used as a dispersant is a comb polymer and is based on the monomers maleic acid, acrylic acid, and vinyloxybutylpolyethylene glycol 5800. The molar ratio of acrylic acid to maleic acid is 7. Mw=40 000 g/mol as determined via GPC. The solids content is 45 wt %. The synthesis is described for example in EP 894 811. The charge density is 930 µeq/g.

Synthesis of Hardening Accelerator Suspensions 4 different C-S-H containing hardening accelerator suspensions were produced. The weight of the different materials for the synthesis is given in table 3. The synthesis was performed according to the steps described below and the weight of starting materials used for each suspension is given in table 3.

Step 1: Preparation of calcium source CVL for the synthesis by (i) dissolution of amidosulfonic acid (ASA) in water and (ii) addition of calcium hydroxide (CH).

Step 2: Preparation of silicate source SVL for the synthesis by dissolution of sodium metasilicate pentahydrate (NaSi) in water.

Step 3: A dispersant solution PL was prepared by mixing a solution of polymer 4 (45 wt % strength polymer solution) and water.

Step 4: The dispersant solution (PL) was introduced initially and pumped in circulation through a high-energy mixer with a mixing volume of 20 ml and equipped with a rotor/stator system. In the high-energy mixer, the calcium source CVL and the silicate source SVL are metered completely into the initially introduced dispersant solution over 80 minutes, with the rotor/stator system operating at a rotational speed of 8000 rpm. During this procedure, the initially introduced solution is maintained at 20° C.

The solid content of the suspensions CSH 2.1 to 2.4 was determined by drying the suspensions at 60° C. for 12 hours in a laboratory oven. The solid content was determined from the weight loss before and after drying.

For comparative purposes each suspension was also dried without addition of calcium hydroxide (labelled CSH-P 2.1 to CSH-P 2.4) at the same drying conditions as described above.

An overview over the powdered samples and the composition of the feedstock is given in table 4 below.

TABLE 4

| Powder | Type | CSH suspension | Weight CSH suspension (g) | Weight calcium hydroxide (g) |
|---|---|---|---|---|
| CSH-CH-P 2.1 | Invention | CSH 2.1 | 400 | 4.96 |
| CSH-CH-P 2.2 | Invention | CSH 2.2 | 400 | 5.02 |
| CSH-CH-P 2.3 | Invention | CSH 2.3 | 400 | 5.12 |
| CSH-CH-P 2.4 | Invention | CSH 2.4 | 400 | 5.26 |
| CSH-P 2.1 | Comparative | CSH 2.1 | 400 | 0.00 |
| CSH-P 2.2 | Comparative | CSH 2.2 | 400 | 0.00 |
| CSH-P 2.3 | Comparative | CSH 2.3 | 400 | 0.00 |
| CSH-P 2.4 | Comparative | CSH 2.4 | 400 | 0.00 |

The effect of the hardening accelerators CSH-CH-P 2.1 to CSH-CH-P 2.4 and CSH-P 2.1 to CSH-P 2.4 in powder form was tested for mortar by measuring the release of heat using heat flow calorimetry.

Mortar Composition:
500 g OPC (CEM I 52.5 R Milke premium, HeidelbergCement)
500 g Sand (BCS221, Strobel Quarzsand)
M g powder containing hardening accelerator
for CSH-CH-P 2.1 to CSH-CH-P 2.4: M=10.53 g
for CSH-P 2.1 to CSH-P 2.4: M=10.00 g
225 g water The hardening accelerator was mixed with the batching water, and the resulting suspension was mixed with Portland

TABLE 3

| | CVL | | | SVL | | PL | | molar | Solid |
|---|---|---|---|---|---|---|---|---|---|
| sample | weight Ca(OH)$_2$ (g) | weight amido-sulfonic acid (g) | weight water (g) | weight Na$_2$SiO$_3$•5H$_2$O (g) | weight water (g) | weight solution of polymer A (g) | weight water (g) | ratio Ca/Si | content (%) |
| CSH 2.1 | 43.76 | 112.38 | 280.70 | 104.95 | 93.09 | 101.93 | 263.19 | 1.17 | 24.8 |
| CSH 2.2 | 47.52 | 122.06 | 304.86 | 98.78 | 87.62 | 95.94 | 243.22 | 1.35 | 25.1 |
| CSH 2.3 | 50.34 | 129.29 | 322.92 | 94.17 | 83.53 | 91.46 | 228.29 | 1.5 | 25.6 |
| CSH 2.4 | 55.25 | 141.90 | 354.42 | 86.13 | 76.40 | 83.65 | 202.24 | 1.8 | 26.3 |

Production of Powdered Samples:

For the production of the hardening accelerators of the invention the suspensions CSH 2.1 to 2.4 were mixed with calcium hydroxide before drying. The dosage of calcium hydroxide was 5% by weight of solids in the suspension CSH 2.1 to 2.4. The mixture of the accelerator suspensions and calcium hydroxide was stirred for 10 min. The resulting suspensions were used as feedstock for the drying process.

Each feedstock was dried in a lab spray dryer type "Mobile Minor Type MM I" manufactured by company GEA Niro. The drying conditions were:

Inlet temperature: 230° C.
Outlet temperature: 98° C.
Drying gas: Nitrogen
Nozzle: 2-fluid nozzle The resulting powders according to the invention are labelled CSH-CH-P 2.1 to CSH-CH-P 2.4.

cement and quartz sand in a mortar mixer (Eirich lab mixer EL 01) at a shear rate of 2 m/s for 60 seconds. The water-to-cement ratio (w/c) was set at 0.45. 6 g of the resulting mortar were put into the measurement cell of a heat flow calorimeter (TAM Air, TA instruments) and the heat release was measured over time for 24 hours. The addition of the accelerator of the invention accelerates the hardening of the mortar. The heat released between 0.5 hours and 6 hours after addition of water to the cement was calculated and is reflecting the degree of hydration in this time. The degree of hydration is a measure of the hardening of the mortar (L. Frølich Engsig: Compressive strength prediction at 1 day using isothermal calorimetry heat of hydration. Oral presentation, Meeting on Applications of Isothermal calorimetry in the Cement Industry. TU Berlin, 10.-15. Apr. 2014).

For a further comparison with the mortar compositions of the invention the mortars containing the powders CSH-P 2.1 to CSH-P 2.4 were also mixed with calcium hydroxide (physical mixture) to determine the effect of calcium hydroxide on the hydration kinetics (see mortars labelled M4, M8, M12, and M16) The compositions of the mortars tested are shown in table 5.

TABLE 5

| Mortar | Type | Accelerator | Weight of accelerator (g) | Ca(OH)$_2$ (g) | OPC (g) | Sand (g) | Water (g) |
|---|---|---|---|---|---|---|---|
| M1 | Comparative | — | — | — | 500 | 500 | 225 |
| M2 | Comparative | CSH 2.1 | 40.32 | — | 500 | 500 | 194.7 |
| M3 | Comparative | CSH-P 2.1 | 10.00 | — | 500 | 500 | 225 |
| M4 | Comparative | CSH-P 2.1 | 10.00 | 0.53 | 500 | 500 | 225 |
| M5 | Inventive | CSH-CH-P 2.1 | 10.53 | — | 500 | 500 | 225 |
| M6 | Comparative | CSH 2.2 | 39.84 | — | 500 | 500 | 195.2 |
| M7 | Comparative | CSH-P 2.2 | 10.00 | — | 500 | 500 | 225 |
| M8 | Comparative | CSH-P 2.2 | 10.00 | 0.53 | 500 | 500 | 225 |
| M9 | Inventive | CSH-CH-P 2.2 | 10.53 | — | 500 | 500 | 225 |
| M10 | Comparative | CSH 2.3 | 39.06 | — | 500 | 500 | 195.9 |
| M11 | Comparative | CSH-P 2.3 | 10.00 | — | 500 | 500 | 225 |
| M12 | Comparative | CSH-P 2.3 | 10.00 | 0.53 | 500 | 500 | 225 |
| M13 | Inventive | CSH-CH-P 2.3 | 10.53 | — | 500 | 500 | 225 |
| M14 | Comparative | CSH 2.4 | 38.02 | — | 500 | 500 | 197.0 |
| M15 | Comparative | CSH-P 2.4 | 10.00 | — | 500 | 500 | 225 |
| M16 | Comparative | CSH-P 2.4 | 10.00 | 0.53 | 500 | 500 | 225 |
| M17 | Inventive | CSH-CH-P 2.4 | 10.53 | — | 500 | 500 | 225 |

The measured cumulated heat between 0.5 and 6 hours of all mortars tested is shown in table 6.

TABLE 6

| Mortar | Type | Accelerator | Molar Ca/Si ratio in accelerator | Specific heat of hydration in J/g mortar | Difference to corresponding suspension (%) |
|---|---|---|---|---|---|
| M1 | Comparative | — | | 13.07 | — |
| M2 | Comparative | CSH 2.1 | 1.17 | 40.97 | 0.0 |
| M3 | Comparative | CSH-P 2.1 | 1.17 | 26.87 | −34.4 |
| M4 | Comparative | CSH-P 2.1 | 1.17 | 27.03 | −34.0 |
| M5 | Inventive | CSH-CH-P 2.1 | 1.17 | 38.61 | −5.8 |
| M6 | Comparative | CSH 2.2 | 1.35 | 38.70 | 0.0 |
| M7 | Comparative | CSH-P 2.2 | 1.35 | 30.81 | −20.4 |
| M8 | Comparative | CSH-P 2.2 | 1.35 | 31.18 | −19.4 |
| M9 | Inventive | CSH-CH-P 2.2 | 1.35 | 37.99 | −1.8 |
| M10 | Comparative | CSH 2.3 | 1.50 | 37.81 | 0.0 |
| M11 | Comparative | CSH-P 2.3 | 1.50 | 32.48 | −14.1 |
| M12 | Comparative | CSH-P 2.3 | 1.50 | 33.22 | −12.1 |
| M13 | Inventive | CSH-CH-P 2.3 | 1.50 | 37.17 | −1.7 |
| M14 | Comparative | CSH 2.4 | 1.80 | 35.62 | 0.0 |
| M15 | Comparative | CSH-P 2.4 | 1.80 | 32.34 | −9.2 |
| M16 | Comparative | CSH-P 2.4 | 1.80 | 32.97 | −7.4 |
| M17 | Inventive | CSH-CH-P 2.4 | 1.80 | 34.86 | −2.1 |

The cumulated heat of hydration is calculated between 0.5 hours and 6 hours. To start the calculation beginning after 0.5 hours was made to eliminate errors in the measurement resulting from placing the sample into the calorimeter. The determination of the heat of hydration until 6 hours was made to describe the maximum acceleration which should be between 4 to 8 hours.

As shown in table 6, the accelerators according to the invention show a performance which is only slightly lower as compared to the accelerators CSH 2.1 to CSH 2.4 (CSH suspension). M3 to M5 are representing the performance of powdered accelerators based on a suspension with a molar Ca/Si ratio of 1.17. M3 and M4 are comparative examples representing the accelerators of the prior art where the starting suspension (used in M2) is dried without further addition of calcium hydroxide. The performance of these powders is much lower compared to the corresponding powder M5 of the invention where the calcium hydroxide was added to the suspension before the drying step. Even an addition of the same amount of calcium hydroxide to a comparative powder (dried without addition of calcium hydroxide) in the mortar test (M4) cannot improve the performance of the non-inventive powder (CSH-P-2.1).

A corresponding result is obtained with compositions M6 to M17.

The mortar tests clearly show that independent from the initial molar Ca/Si-ratio of the corresponding suspension which is used for the production of the powdered accelerator of the invention, the addition of a Ca-salt before the drying step improves surprisingly the performance of the resulting accelerator powder.

The invention claimed is:
1. A method for producing a calcium silicate hydrate-comprising hardening accelerator in powder form, which comprises the steps of
 (a) providing an aqueous suspension comprising calcium silicate hydrate;
 (b) mixing at least one calcium compound, selected from calcium acetate, calcium formate, calcium hydroxide, calcium oxide, and mixtures of two or more of said compounds, with the aqueous suspension comprising calcium silicate hydrate; and (c) drying the resulting mixture.

2. The method according to claim 1, wherein the suspension comprising calcium silicate hydrate is obtained by reacting an aqueous solution or suspension of a calcium source with an aqueous solution or suspension of a silicate source in the presence of at least one polymeric dispersant which comprises structural units having anionic or anionogenic groups and structural units having polyether side chains.

3. The method according to claim 1, wherein the calcium compound is selected from calcium hydroxide, calcium oxide, and mixtures thereof.

4. The method according to claim 1, wherein the calcium compound in an amount of 0.5 to 150 wt % based on the solids content of the calcium silicate hydrate-comprising suspension from step (a), is mixed with the calcium silicate hydrate-comprising suspension from step (a).

5. The method according to claim 1, wherein the drying is accomplished by spray drying or roll drying.

6. The method according to claim 1, wherein the calcium compound in an amount of 1 to 30 wt %, based on the solids content of the calcium silicate hydrate-comprising suspension from step (a), is mixed with the calcium silicate hydrate-comprising suspension from step (a).

7. The method of claim 1 comprising utilizing the calcium compound as a drying aid in the drying of the aqueous suspension comprising calcium silicate hydrate.

8. The method of claim 1 comprising utilizing the calcium compound for improving the redispersibility of the calcium silicate hydrate-comprising hardening accelerators in powder form.

9. A calcium silicate hydrate-comprising hardening accelerator in powder form, obtained by the method according to claim 1.

10. A building material mixture which comprises the calcium silicate hydrate-comprising hardening accelerator in powder form according to claim 9, and a hydraulic and/or latent hydraulic binder.

11. A process comprising mixing the calcium silicate hydrate-comprising hardening accelerator in powder form according to claim 9 in a building material mixture which comprises a hydraulic and/or latent hydraulic binder.

12. A process comprising mixing the calcium silicate hydrate-comprising hardening accelerator in powder form according to claim 9 as an admixture for hydraulic and/or latent hydraulic binders.

13. A method for accelerating the hardening of a building material mixture which comprises adding the calcium silicate hydrate-comprising hardening accelerator of claim 9 in powder form to the building material mixture comprising a hydraulic and/or latent hydraulic binder and allowing the obtained mixture to harden.

* * * * *